(12) United States Patent
Didomenico

(10) Patent No.: US 11,902,624 B2
(45) Date of Patent: Feb. 13, 2024

(54) SYSTEM AND METHOD FOR DELIVERING VIDEO ON DEMAND

(71) Applicant: eVideo Incorporated, Potomac, MD (US)

(72) Inventor: Mauro Didomenico, Bernardsville, NJ (US)

(73) Assignee: eVideo Incorporated, Potomac, MD (US)

( * ) Notice: Subject to any disclaimer, the term of this patent is extended or adjusted under 35 U.S.C. 154(b) by 76 days.

(21) Appl. No.: 15/135,772

(22) Filed: Apr. 22, 2016

(65) Prior Publication Data

US 2016/0241917 A1 Aug. 18, 2016

Related U.S. Application Data

(63) Continuation of application No. 13/333,840, filed on Dec. 21, 2011, now abandoned, which is a continuation of application No. 09/840,868, filed on Apr. 25, 2001, now abandoned.

(60) Provisional application No. 60/259,903, filed on Jan. 8, 2001.

(51) Int. Cl.
| | |
|---|---|
| *H04N 21/472* | (2011.01) |
| *H04N 21/41* | (2011.01) |
| *H04N 21/2225* | (2011.01) |
| *H04N 21/435* | (2011.01) |
| *H04N 21/231* | (2011.01) |
| *H04N 21/482* | (2011.01) |
| *H04N 21/61* | (2011.01) |
| *H04N 21/643* | (2011.01) |

(52) U.S. Cl.
CPC ... *H04N 21/47202* (2013.01); *H04N 21/2225* (2013.01); *H04N 21/23113* (2013.01); *H04N 21/4108* (2013.01); *H04N 21/4113* (2013.01); *H04N 21/4353* (2013.01); *H04N 21/482* (2013.01); *H04N 21/6125* (2013.01); *H04N 21/64322* (2013.01)

(58) Field of Classification Search
CPC ......... H04N 21/47202; H04N 7/17318; H04N 7/173336; H04N 21/2543; H04N 21/84
USPC .......... 725/86–87, 89, 98, 100, 118
See application file for complete search history.

(56) References Cited

U.S. PATENT DOCUMENTS

| | | | |
|---|---|---|---|
| 5,400,402 | A | 3/1995 | Garfinkle |
| 5,534,912 | A | 7/1996 | Kostreski |
| 5,534,913 | A | 7/1996 | Majeti et al. |
| 5,544,327 | A | 8/1996 | Dan et al. |
| 5,568,181 | A | 10/1996 | Greenwood et al. |
| 5,583,561 | A | 12/1996 | Baker et al. |
| 5,644,714 | A | 7/1997 | Kikinis |
| 5,675,732 | A | 10/1997 | Majeti et al. |
| 5,675,738 | A | 10/1997 | Suzuki et al. |

(Continued)

OTHER PUBLICATIONS

Carsten Griwodz et al., "Position Paper: Internet VoD Cache Server Design", XP002173237, ACP Multimedia 99, Part II, Oct. 30, 1999-Nov. 4, 1999. pp. 123-126.

*Primary Examiner* — Jason Salce
(74) *Attorney, Agent, or Firm* — Clark & Brody LP

(57) ABSTRACT

A system and method of delivering video on demand includes a web site for receiving customer requests for video content, locating the requested content on one of a plurality of distributed video servers, and arranging the located content to be distributed to the customer's set top box via a broadband connection.

2 Claims, 2 Drawing Sheets

(56) References Cited

U.S. PATENT DOCUMENTS

| | | |
|---|---|---|
| 5,701,582 A | 12/1997 | DeBey |
| 5,715,403 A | 2/1998 | Stefik |
| 5,742,816 A | 4/1998 | Barr et al. |
| 5,745,710 A | 4/1998 | Clanton, III et al. |
| 5,751,282 A | 5/1998 | Girard et al. |
| 5,761,602 A | 6/1998 | Wagner et al. |
| 5,796,828 A | 8/1998 | Tsukamoto et al. |
| 5,802,449 A | 9/1998 | Beller et al. |
| 5,808,607 A | 9/1998 | Brady et al. |
| 5,815,194 A | 9/1998 | Ueda |
| 5,815,195 A | 9/1998 | Tam |
| 5,819,286 A | 10/1998 | Yang et al. |
| 5,867,155 A | 2/1999 | Williams |
| 5,873,076 A | 2/1999 | Barr et al. |
| 5,892,508 A | 4/1999 | Howe et al. |
| 5,898,833 A | 4/1999 | Kidder |
| 5,903,314 A | 5/1999 | Niijima et al. |
| 5,914,712 A | 6/1999 | Sartain et al. |
| 5,956,716 A | 9/1999 | Kenner et al. |
| 5,973,680 A | 10/1999 | Ueda |
| 5,991,596 A | 11/1999 | Cunningham et al. |
| 6,005,561 A | 12/1999 | Hawkins et al. |
| 6,006,257 A | 12/1999 | Slezak |
| 6,018,765 A | 1/2000 | Durana et al. |
| 6,020,912 A | 2/2000 | De Lang |
| 6,046,760 A | 4/2000 | Jun |
| 6,049,823 A | 4/2000 | Hwang |
| 6,055,314 A | 4/2000 | Spies et al. |
| 6,101,535 A | 8/2000 | Hussmann et al. |
| 6,105,060 A | 8/2000 | Rothblatt |
| 6,115,740 A | 9/2000 | Mizutani |
| 6,133,912 A | 10/2000 | Montero |
| 6,141,682 A | 10/2000 | Barker |
| 6,144,402 A | 11/2000 | Norsworthy et al. |
| 6,188,398 B1 | 2/2001 | Collins-Rector et al. |
| 6,188,684 B1 | 2/2001 | Setoyama et al. |
| 6,195,364 B1 | 2/2001 | Brodigan |
| 6,209,025 B1 | 3/2001 | Bellamy |
| 6,269,394 B1 | 7/2001 | Kenner et al. |
| 6,286,139 B1 | 9/2001 | Decinque |
| 6,385,647 B1 | 5/2002 | Willis |
| 6,438,596 B1 | 8/2002 | Ueno et al. |
| 6,459,427 B1 | 10/2002 | Mao et al. |
| 6,460,076 B1 | 10/2002 | Srinivasan |
| 6,496,856 B1 | 12/2002 | Kenner et al. |
| 6,609,253 B1 | 8/2003 | Swix et al. |
| 6,637,032 B1 | 10/2003 | Feinleib |
| 6,968,364 B1 | 11/2005 | Wong et al. |
| 7,536,705 B1 * | 5/2009 | Boucher ............ H04L 12/1836 725/112 |
| 2002/0046407 A1 | 4/2002 | Franco |

\* cited by examiner

SYSTEM AND METHOD FOR DELIVERING VIDEO ON DEMAND

This application is a Continuation of U.S. Ser. No. 13/333,840 filed on Dec. 21, 2011, which is a Continuation of U.S. Ser. No. 09/840,868, filed on Apr. 25, 2001, which claims benefit of U.S. Provisional Ser. No. 60/259,903, filed on Jan. 8, 2001, the contents of which are hereby incorporated by reference in their entirety herein.

RELATED APPLICATIONS

The present application claims the benefit of U.S. Provisional Application Ser. No. 60/259,903 entitled "System and Method for Delivering Video on Demand" filed on Jan. 8, 2001 by Mauro DiDomenico, the contents of which are hereby incorporated by reference in their entirety herein.

FIELD OF THE INVENTION

The present invention relates to telecommunications and more particularly to delivering video on demand.

BACKGROUND OF THE INVENTION

Ever since the invention of the motion pictures, consumers have been clamoring for both convenience and selection in their audiovisual entertainment options. For example, the single-screen movie theater has largely been replaced by multiplex movies theaters having multiple screens showing many different movies at dozens of viewing times. Over the past few decades, cable television programming offers hundreds of channels filled with movies and other forms of audio video programming. These approaches are not convenient for people because the programming is shown at a specific time, for which customers must arrange their schedules. Accordingly, the latest trend in video programming is video-on-demand (VOD), which not only provides a wide array of movie and video selections but allows the consumer the convenience of choosing when the selected programming is to be delivered to the consumer's home.

In conventional video-on-demand systems, the customer has a set top box that is used to communicate up-stream to the headend server through a low-speed connection on the same network transmission path that delivers the downstream broadband video selections to the set top box. In these configurations, the headend is typically a site that houses the video server, storage and other server components for the two-way interactivity and program delivery. These systems require sophisticated and expensive set top boxes and place a great deal of stress on the video server's communication interface that ties the server into the broadband network. This server-network problem is typically cast in terms of the number of simultaneous, or contemporaneous, video streams that the server can deliver to the network. The number of streams is equal to the number of customers seeking VOD service at any point in time. One solution to this problem is to replicate video server sites and video content and use the servers as nodal points for serving groups of customers. In these conventional configurations, however, there is considerable difficulty in aggregating different video content in different servers and connecting "through" one server to find and reach content stored on another server.

One factor that is impeding the acceptance of VOD services is the concern among copyright owners of the video material about piracy, which is the unauthorized duplication of the owner's movies and other video content. For example, some customers are beginning to use set top boxes that have a large hard disk that stores the movie, thereby providing VCR-like functionality, such as pause and rewind. Because a copy of the movie is stored at the customer's premises, there is the possibility that that copy would be pirated, i.e. reproduced without authorization. Consequently, there has been much interest in using encryption to protect the video content, but encryption is costly in terms of software and hardware support and difficult to manage properly with hundreds of thousands of customers in a manner that does not compromise security. For these reason there is a need for a way to protect the owner's copyright in the video content without spoiling the customer's convenience.

SUMMARY OF THE INVENTION

The present invention addresses the difficulties of conventional VOD systems by connecting a video-on-demand (VOD) portal to a multiplicity of media-server/video-asset-storage sites from which video content selected by the customer can be downloaded to the customer's residence. The VOD portal may be accessed through the Internet from a home PC and provides the interactivity leading to video (program) selection to take place. The VOD portal is connected via the Internet to the multiplicity of video servers where the video content is stored. Distributed search software is employed to locate the video server on which the customer's video program selection resides. The search software in effect ties together the multiplicity of video servers to the web-site/portal thereby creating in effect a giant integrated headend server. This integrated server is capable of representing the stored content on the individual servers as a single video content directory at the portal. The portal controls the delivery of content from the individual servers and provides for the downloading of the customer's program selection from the appropriate video server where the content resides.

On command from the VOD portal, the appropriate video server downloads the video program material that the customer selected to his/her residence by making an IP call to his/her set top box using the H.323 protocol. The downloaded video signal travels through broadband Internet connections to the customer's "last mile" broadband connection, which can be, for example, either cable or DSL (digital subscriber line). In this embodiment of VOD distribution, the VOD headend comprises a networked collection of video-server/video-asset-storage sites all connected together via the Internet and all under the control of the VOD portal, which serves as the customer's point of contact for obtaining all the customer's on-demand video programming needs. The search software that links all the server/storage sites to the eVideo Web site insures that the customer's video selection can be automatically located via a centralized directory at the portal site and downloaded to the customer's residence.

In one implementation, attaching a piece of active code to each downloaded video file provides protection over the copyright owner's content on the customer's set top boxes. The active code, when downloaded, causes the downloaded video file to be deleted after a set amount of time or upon viewing the video file. Thus, video content is being protected from piracy without having to use costly and difficult to manage encryption techniques.

Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system, method, and software for video-on-demand are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
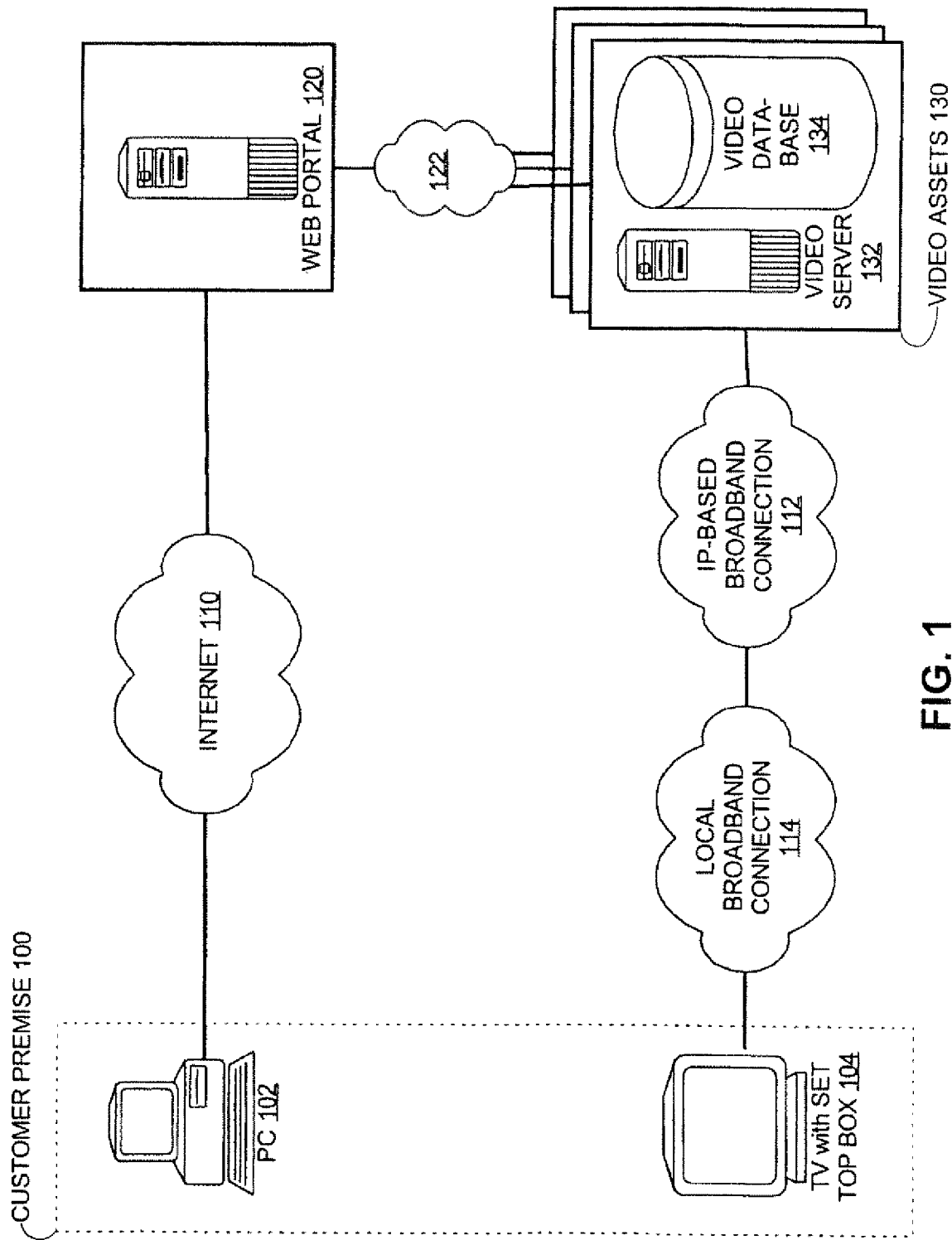
FIG. 1 depicts a network for providing video-on-demand services in accordance with one embodiment of the present invention.

FIG. 1 depicts an exemplary configuration of one embodiment of the present invention, in which a customer's premise 100 includes a personal computer (PC) 102 and at television with a set top box 104. Although the PC 102 and the set top box 104 are illustrated separately, they may be combined into a single, high-end set top box 104 capable of Internet connections. The PC 102 is in communication with a video-on-demand (VOD) portal 120 via the Internet 110.

The VOD portal 120 is preferably housed at a web site and is connected to a plurality of media-server/video-asset-storage sites 130 from which video content selected by the customer can be downloaded to the customer's residence. The video content preferably comprises digitally encoded video material that is readily transmitted over a computer network. For example, the video content may be encoded in one of the various MPEG coding standards, such as MPEG1, which provides VHS-like quality at 1.5 Mb/sec, and MPEG2, which provides DVD-like quality at 4-6 Mb/sec. The present invention is not limited to these particular video formats, and the video content can be encoded in any of a variety of different formats and transmitted in a variety of different ways.

The VOD portal 120 may be accessed through the Internet 110 from the home PC 102 and provides the interactivity path where video (program) selection takes place. The VOD portal 120 is connected via the Internet 122 to the video servers 130 where the video content is stored. Distributed search software is employed to create a centralized video content directory at the portal site and to locate the video server 130 on which the customer's video program selection resides, by communicating with a respective video server 132 that is responsible for managing the video content in a video database 134.

Various kinds of distributed search software may be employed. For example, the VOD portal 120 may record an entry for every video file stored on a video server 132. Thus, the VOD portal 120 indexes all of the video files stored on all of the video servers 132 in a centralized listing. In this approach, the VOD portal 120 provides a search capability that allows the customer to specify search criteria, such as the title, category (action, drama, comedy, etc.), actor, director, studio and year. In another approach, the search can be peer-to-peer, in which the VOD portal 120 queries the various video servers 132 for the customer's search criteria and integrates the results form the video servers 132 into a single list and present the list to the user.

On command from the VOD portal 120, the appropriate video server 132 makes an IP connection to the customer's set top box 104 using, for example, the H.323 protocol. The video server 132 may obtain the customer's IP address information from the VOD portal 120, which maintains that information, received initially from the customer as part of the customer's registration profile. Upon making the IP connection to the customer's set top box 104, the video server 132 specifies the network path through which the video program material that the customer selected is downloaded to the customer's set top box. In one implementation, the video server 132 may use RSVP to obtain the network path (a tunnel through the network) and the Realtime Transfer Protocol (RTP) to set up this Internet connection.

The download travels through broadband Internet connections 112 to the customer's "last mile" broadband connection 114, which can be either cable or DSL (digital subscriber line). In this embodiment of VOD distribution, the VOD headend is in reality a networked collection of video-server/video-asset-storage sites 130 all connected together via the Internet 122 and all under the control of the VOD portal 120, which serves as the customers' portal for obtaining all their on-demand video programming needs. The search software that links all the server/storage sites 130 to the VOD portal 120 insures that the customer's video selection can be automatically located and downloaded to the customer's residence 100.

Set Top Box and Customer Interface

One aspect of the present invention relates to simplifying the interactive programming interface so as to create a simple, familiar, and as inexpensive customer interface. A simple and familiar interactive interface is the PC Web browser. This is an interface that is widely accepted and used worldwide in homes and businesses for obtaining information and conducting e-commerce. In accordance with this aspect of the present invention, the PC is used to access the VOD portal where all program selections are made and where the schedule for viewing programs is made. Viewing can be instantaneous (true VOD) or delayed depending on the choice made by the customer. By entering the VOD portal via a standard Internet connection through a customer owned PC, the customer interface for VOD parallels exactly what customers are exposed to on the web and the e-commerce experiences they are familiar and comfortable with.

By using a PC/web site interface for program selection the VOD set top box is simplified and thereby made significantly less expensive than set top boxes used in conventional VOD schemes. In the accordance with an embodiment of the present invention, the function of the set top box is to decode the MPEG video stream down loaded to the customer's residence. The set top box has a network interface unit that enables it to accommodate cable connections or DSL connections. It complies with the H.323 protocol standard that governs the delivery of IP video from the server to the set top box. The set top box has an IP address that is communicated by the customer to VOD portal when the VOD/e-entertainment program selection session is set up. Preferably, the customers' set top box IP address would be stored in the customer's PC hard drive and delivered to the web site when the web site is reached and communicated to the VOD portal when the interactive VOD session begun. All of the information for compliant set top boxes is made available through the VOD portal, enabling customers to make their own selection of set top boxes that are available on the market. Since the compliant set top box is a simple decoding box, it advantageously is easily integrated into standard cable set top boxes allowing customers to have one set top box for cable and VOD.

In other embodiments, such as in high-end set top box markets, the browser Internet function provided by stand alone PCs as described above could be integrated in the set top box itself. These set top boxes allow customers to reach the VOD portal through the set top box and to conduct the VOD interactive program selection session on their television screens.

The set top box can also comprise a hard disk and associated software for buffering the incoming the video stream. This capability allows the user to employ VCR-like controls on the downloaded content, such as pause, rewind, and frame-by-frame move. To address piracy concerns on such intelligent set top boxes without necessarily using encryption, the downloaded video file can include a piece of active code that automatically deletes the video file after a set amount of time (e.g. two or three hours) or upon completion of viewing the video file.

Broadband Network Issues

Another aspect of the present invention pertains to creating a Web site and portal for making program selections and to link the Web site with video server and storage centers from which video program delivery occurs. The video programs are delivered over the broadband Internet by means of IP video that conforms to the H.323 protocol standard. It is assumed that customers have "last mile" broadband connections of their own and that these have sufficient bandwidth to support the delivery of video streams (all local network requirements are posted on the eVideo Web site). This means that anyone with a broadband connection—a cable connection, or a DSL connection, or a DBS connection—is a potential customer for VOD service.

VOD Headend

Another aspect of the present invention involves separating content, or video asset, aggregation and delivery from the customer interface functions of program navigation and selection. When this is done, a compound VOD headend configuration can be created having an integrated collection of physically and geographically separated component parts. Central to this embodiment is a centralized, common Web site connected to a multiplicity of video servers and video storage sites. The advantages of this approach lies not only in the creation of a dispersed headend, but in the dispersion of video content in a multiplicity of server sites having software linkages where each server has some of the aggregate total video content available to customers.

The software linking the multiplicity of server and storage sites may employ a centralized or a peer-to-peer listing capability. This software allows the video servers to be integrated in such a way that any customer's video content selection could be located on the video database of the server it resides in. From that video server, the selected video program is streamed over the Internet to the customer's set top box on-demand. The video content may be encrypted and stored on the servers and the set top boxes would contain the de-encryption software to protect the content providers against any pirating of the video content. Other protections may include firewalls between the web site and the video server sites to make the distributed headend secure.

This is a powerful headend configuration, which enables some embodiments of the present invention to have one common VOD e-entertainment portal through a centralized Web site. It allows embodiments of the present invention to place video servers anywhere it chooses to. It allows the present invention to disperse video content in ways that satisfy the demands and needs of video content providers and producers. It allows content providers and producers to control the distribution and pricing of their content since their content can be dealt with and managed separately and individually. Importantly, it allows embodiments of the present invention to optimize the streaming of video content into the network so as to reduce and minimize (eliminate) traffic congestion problems that occur in the conventional configurations where the content is stored centrally in the database of a central video server.

Business Model

The approach to VOD and e-entertainment outlined herein and shown schematically in FIG. 1 creates the opportunity for a new business model for VOD distribution. In this model, customers have control of the entertainment products they buy. They only pay for what they see on a pay per view basis. All pricing is handled through the eVideo Web site and all transactions are through credit card purchases. In essence, customers have a completely automated virtual video store at their disposal any time of day. All of the video components from the customer side are customer owned or customer obtained, such as the local broadband connection and set top box. The VOD provider sets up the Web site creating the VOD and e-entertainment portal. The e-commerce functions that are part of the VOD would occur through the eVideo Web site. The VOD provider would set up through ownership, or partnering relationships, the video server network configuration with the search software that integrates all the server sites together. The VOD provider markets its VOD delivery capabilities to video content providers and producers giving them the opportunity to reach customers on the terms and conditions that are best suited to their business interests. From the standpoint of content producers, the VOD provider is creating an electronic virtual theater with electronic ticketing for video asset event distribution to a wide assortment of customers that have broadband connections. These customers could be in cable networks, DSL networks, or DBS networks.

Through the VOD provider's Web site, standard web-based advertising could be done which would be a separate source of revenue. In addition, content producers would have the opportunity and option of delivering trailers of recent and new films to viewers at their discretion in much the same way that advertising trailers are shown on home rental videotapes. This adds to the degrees of freedom and control that the present invention provides to content distributors and producers.

Hardware Overview

Figure 2:
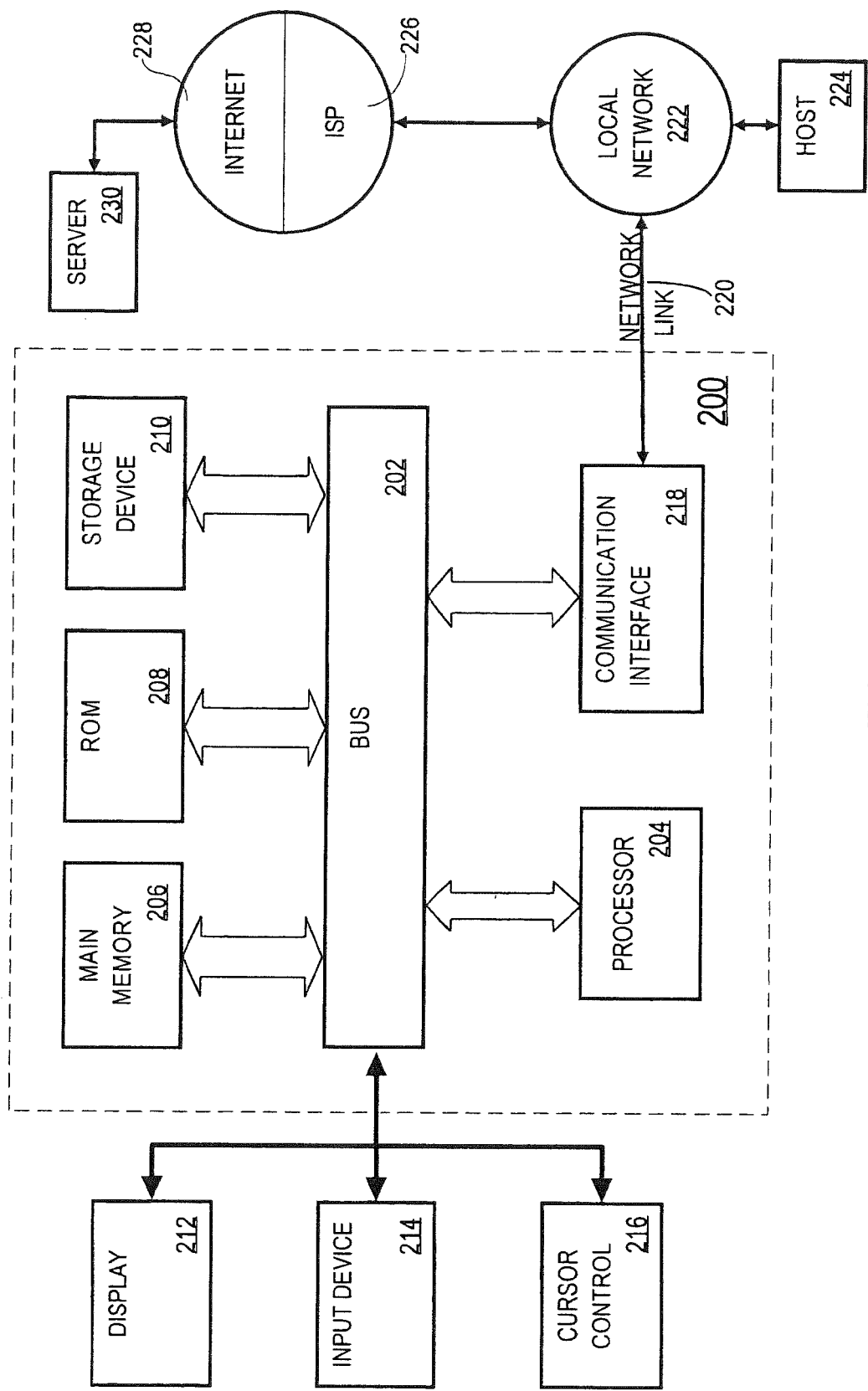
FIG. 2 depicts a computer system that can be used to implement an embodiment of the present invention.

FIG. 2 is a block diagram that illustrates a computer system 200 upon which embodiments of the invention may be implemented. For example, computer systems can be used to implement the PC 102, the set up box 104, the web set 120, and the video server 132. The computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for providing video-on-demand. According to one embodiment of the invention, video-on-demand is provided by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media include, for example, optical or magnetic disks, such as storage device 210. Volatile media include dynamic memory, such as main memory 206. Transmission media include coaxial cables, copper wire and fiber optics, including the wires that comprise bus 202. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network, now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220, and communication interface 218. In the Internet example, a server 230 might transmit a requested code for an application program through Internet 228, ISP 226, local network 222, and communication interface 218. In accordance with the invention, one such downloaded application provides for providing video-on-demand as described herein. The code may be executed by processor 204 as it is received, and/or stored in storage device 210, or other non-volatile storage for later execution. In this manner, computer system 200 may obtain application code in the form of a carrier wave.

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

The invention claimed is:

1. A method for providing video on demand at a portal hosted at a web site and in communication with a plurality of video servers via a packet data communication network, consisting of the steps of:

establishing a communications session with a user via the packet data communication network with a browser executing on a computer operated by the user, the user having no initial relationship to the portal;

receiving an Internet Protocol (IP) address of a video decoding device of the user, optionally owned by the user, from the browser via the communications session, a request from the user for a particular video selection as part of said communications session, and payment from the user for the requested particular video selection;

searching a plurality of video servers for the video selection via the packet data communication network during said communications session, the plurality of video servers including a list of video content for selection by the user;

selecting one of the video servers that stores video content that corresponds to the user video selection during said communication session; and communicating the received Internet Protocol (IP) address of the video decoding device at the user's location to the selected video server during said communication session;

causing the selected video server to download the corresponding video content to the video decoding device during said communication session for viewing the video content at a customer's premise, the communication session starting with the establishing step and ending when the video content is downloaded, wherein the absence of any initial relationship with the portal, paying for the video content at the time of request, and using of the IP address as part of the communications session allows the user to be independent of the portal and permits obtaining a desired video selection whenever the user decides, and wherein the method permits a user to request additional video content.

2. A method for providing video on demand at a portal hosted at a web site and in communication with a plurality of video servers via a packet data communication network, consisting of the steps of:

establishing a communications session with a user via the packet data communication network with a browser executing on a computer operated by the user, the user having no initial relationship to the portal;

receiving an Internet Protocol (IP) address of a video decoding device of the user, optionally owned by the user, from the browser via the communications session, a request from the user for a particular video selection as part of said communications session, and payment from the user for the requested particular video selection;

searching a plurality of video servers for the video selection via the packet data communication network during said communications session, the plurality of video servers including a list of video content for selection by the user;

selecting one of the video servers that stores video content that corresponds to the user video selection during said communication session; and communicating the received Internet Protocol (IP) address of the video decoding device at the user's location to the selected video server during said communication session;

causing the selected video server to download the corresponding video content to the video decoding device during said communication session for viewing the video content at a customer's premise, the communication session starting with the establishing step and ending when the video content is downloaded, wherein the absence of any initial relationship with the portal, paying for the video content at the time of request, and using of the IP address as part of the communications session allows the user to be independent of the portal and permits obtaining a desired video selection whenever the user decides, and wherein the method permits a user to request additional video content, wherein the particular video server is configured to attach a piece of active code to the selected video content, such that, upon execution of the active code, the set-top box deletes the selected video content from the set-top box, wherein the deletion occurs after a set amount of time or after the video content is viewed.

\* \* \* \* \*